(12) United States Patent
Newman et al.

(10) Patent No.: US 11,178,848 B2
(45) Date of Patent: Nov. 23, 2021

(54) WISER WHELPER

(71) Applicants: Brittney Newman, Robertsdale, AL (US); Billy Vitale, Robertsdale, AL (US)

(72) Inventors: Brittney Newman, Robertsdale, AL (US); Billy Vitale, Robertsdale, AL (US)

( * ) Notice: Subject to any disclaimer, the term of this patent is extended or adjusted under 35 U.S.C. 154(b) by 86 days.

(21) Appl. No.: 16/200,264

(22) Filed: Nov. 26, 2018

(65) Prior Publication Data
US 2020/0053977 A1 Feb. 20, 2020

Related U.S. Application Data

(60) Provisional application No. 62/590,626, filed on Nov. 26, 2017.

(51) Int. Cl.
*A01K 1/03* (2006.01)
*A01K 1/00* (2006.01)

(52) U.S. Cl.
CPC .............. *A01K 1/03* (2013.01); *A01K 1/0035* (2013.01)

(58) Field of Classification Search
CPC .. A01K 1/0353; A01K 1/0245; A01K 1/0218; A01K 1/035; A01K 1/03; A01K 1/033; A01K 1/034; A01K 31/08; A01K 1/0125; A01K 1/0157; A01K 1/02; A01K 1/0272; A01K 31/007
USPC ....... 119/482, 474, 498, 499, 28.5, 504, 168
See application file for complete search history.

(56) References Cited

U.S. PATENT DOCUMENTS

| | | | | |
|---|---|---|---|---|
| 1,198,524 A * | 9/1916 | Cunliffe | ................... | B65D 7/26 220/6 |
| 1,569,710 A * | 1/1926 | Burt | ..................... | A01K 1/0353 119/28.5 |
| 2,552,476 A * | 5/1951 | Barton | ................... | A47C 7/021 5/653 |
| 3,048,147 A * | 8/1962 | Mckean | ................... | B65D 7/28 119/496 |
| 3,611,994 A * | 10/1971 | Bailey | ................. | A01K 1/0245 119/496 |
| 3,902,456 A * | 9/1975 | David | .................. | A01K 1/0353 119/28.5 |
| 4,274,363 A * | 6/1981 | Root | ...................... | A01K 1/035 119/28.5 |
| 4,590,885 A * | 5/1986 | Sugiura | ................ | A01K 1/0245 119/497 |
| 4,673,087 A * | 6/1987 | Webb | ................. | B65D 11/1873 16/225 |
| 4,917,047 A * | 4/1990 | Wazeter, III | ............. | A01K 1/03 119/474 |
| 4,996,944 A * | 3/1991 | Zook | ..................... | A01K 1/035 119/28.5 |
| 5,010,843 A * | 4/1991 | Henry | .................. | A01K 1/0353 119/28.5 |
| 5,154,137 A * | 10/1992 | Stanaland | ............ | A01K 1/0218 119/482 |

(Continued)

*Primary Examiner* — Yvonne R Abbott-Lewis
(74) *Attorney, Agent, or Firm* — Bruce A. Lev (57) ABSTRACT

An improved pet birthing box for animals having a clear enclosure structured and arranged to prevent accidental smothering of puppies by their mothers suitable for use in early life to keep pets contained and safe due to the sides of the box to be erected quickly to mimic a natural den shape thereby aiding puppies get moving faster while being able to be folded down flat for quick storage.

20 Claims, 5 Drawing Sheets

(56) References Cited

U.S. PATENT DOCUMENTS

| | | | | |
|---|---|---|---|---|
| D346,246 S * | 4/1994 | Barreto | | D30/118 |
| 5,392,785 A * | 2/1995 | Donahue | | A47D 13/08 |
| | | | | 128/873 |
| 5,497,729 A * | 3/1996 | Lord | | A01K 1/0218 |
| | | | | 119/513 |
| 6,024,046 A * | 2/2000 | Geiger | | A01K 1/0353 |
| | | | | 119/28.5 |
| 6,092,488 A * | 7/2000 | Allawas | | A01K 1/0245 |
| | | | | 119/474 |
| 6,216,638 B1 * | 4/2001 | Pivonka | | A01K 1/0245 |
| | | | | 119/496 |
| 6,305,317 B1 * | 10/2001 | Spiegel | | A01K 1/0218 |
| | | | | 119/174 |
| 6,513,456 B2 * | 2/2003 | Sherman | | A01K 1/0218 |
| | | | | 119/498 |
| 6,591,787 B1 * | 7/2003 | Gantz | | A01K 1/0272 |
| | | | | 119/771 |
| 7,059,272 B2 * | 6/2006 | Helou | | A01K 1/0125 |
| | | | | 119/168 |
| D561,405 S * | 2/2008 | Kalatsky | | D30/118 |
| 7,481,182 B2 * | 1/2009 | Simpson | | A01K 1/0125 |
| | | | | 119/168 |
| 7,861,458 B2 * | 1/2011 | Apps | | A01K 69/10 |
| | | | | 43/105 |
| 8,132,537 B2 * | 3/2012 | Trunnell | | A01K 1/0245 |
| | | | | 119/496 |
| 8,267,048 B2 * | 9/2012 | Flannery | | A01K 1/0245 |
| | | | | 119/498 |
| 2012/0291711 A1 * | 11/2012 | Baker | | A01K 1/0353 |
| | | | | 119/28.5 |
| 2014/0202390 A1 * | 7/2014 | McNamara | | A01K 1/0157 |
| | | | | 119/6.8 |

* cited by examiner

WISER WHELPER

CROSS-REFERENCE TO RELATED APPLICATION

The present application is related to and claims priority from prior provisional application Ser. No. 62/590,626, filed Nov. 26, 2017 which application is incorporated herein by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever. 37 CFR 1.71(d).

BACKGROUND OF THE INVENTION

The following includes information that may be useful in understanding the present invention(s). It is not an admission that any of the information provided herein is prior art, or material, to the presently described or claimed inventions, or that any publication or document that is specifically or implicitly referenced is prior art.

1. Field of the Invention

The present invention relates generally to the field of pet enclosure devices and more specifically relates to an improved pet birthing box for animals having a clear enclosure structured and arranged to prevent accidental smothering of puppies by their mothers suitable for use in early life to keep pets contained and safe due to the sides of the box to be erected quickly to mimic a natural den shape thereby aiding puppies get moving faster while being able to be folded down flat for quick storage.

2. Description of the Related Art

A dog just like a expecting human mother needs a comfortable place to give birth and take care of their babies. Whelping boxes vary from improvised cardboard boxes to purpose built equipment, typically made of plywood or plastic. Desirable features include ease of cleaning and sanitation, extendibility, and toughness. In some breeding environments portability is also desirable. This is typically achieved through light weight design and emphasis on simple setup and takedown. Commercially available whelping boxes often feature accommodations for accessories such as heat control devices and IP camera attachment.

The sides of the box are designed to be high enough to safely contain the puppies, yet low enough to allow the mother to enter and leave comfortably, with consideration given to her protruding mammary glands. Alternatively, the box is provisioned with a doorway with adjustable height for the same purpose. The bottom of the box may be lined with specially designed "whelping pads," or layers of newspaper (or fabric) to provide insulation from cold floors and to absorb fluids. Fabric covers or partial covers are often used on top to provide a "den-like" environment for the mother. Full covers may be used to prevent puppies from escaping.

A dog needs a comfortable place to give birth and take care of her babies, but unfortunately conventional whelping boxes are hard to keep clean and difficult to monitor for safety. Therefore, a need exits for a pet enclosure to ensure puppies are provided the safest start on life.

Various attempts have been made to solve problems found in pet enclosure devices art. Among these are found in: U.S. Pat. No. 5,154,137 to Arch E. Stanaland; U.S. Pat. No. 4,844,016 to Michael Filosa; U.S. Pub. No. 2009/0151647 to Brenda L. Burrows; U.S. Pat. No. 6,513,456 to Sherman et al; and U.S. Pat. No. 5,497,729 to Catherine S. Lord. This prior art is representative of whelping boxes and transparent pet enclosure devices.

Ideally, an improved pet birthing box for animals should be user-friendly and safe in-use and yet would operate reliably and be manufactured at a modest expense. Thus, a need exists for an improved pet birthing box for animals having a clear enclosure structured and arranged to prevent accidental smothering of puppies by their mothers suitable for use in early life to keep pets contained and safe due to the sides of the box to be erected quickly to mimic a natural den shape thereby aiding puppies get moving faster while being able to be folded down flat for quick storage and to avoid the above-mentioned problems.

BRIEF SUMMARY OF THE INVENTION

In view of the foregoing disadvantages inherent in the known of pet enclosure device art, the present invention provides a novel improved pet birthing box for animals (Entitled the Wiser Whelper). The general purpose of the present invention, which will be described subsequently in greater detail is to provide an improved pet birthing box for animals having a clear enclosure structured and arranged to prevent accidental smothering of puppies by their mothers suitable for use in early life to keep pets contained and safe due to the sides of the box to be erected quickly to mimic a natural den shape thereby aiding puppies get moving faster while being able to be folded down flat for quick storage.

An improved pet birthing box for animals, comprising: a frame; a pad; and a plurality of side panels. The frame includes a plurality of side members. Wherein the plurality of side members are connected together at respective ends thereof forming frame outer edges and a frame panel holding portion.

The pad includes a flat bottom portion and a top portion. Wherein the top portion is formed having a depression therein adapted to prevent a puppy from being smothered by its mother while birthing, nursing, or sleeping. Wherein said pad is adapted to be releasably placed upon the holding portion of the frame and between the frame outer edges.

Wherein the plurality of side panels are each adapted to be pivotally connected to the frame outer edges and extend upwardly therefrom. Wherein the plurality of side panels are adapted to be releasably attach to one another along respective adjacent side portions thereof to form an enclosure around the frame. Wherein when the plurality of side panels are releasably attached to one another along the respective adjacent side portions thereof they form an enclosure around the frame, and when the plurality of side panels are detached from one another along the respective adjacent side portions thereof the panels can be pivoted inwardly toward the pad into a collapsed configuration for storage or transportation.

The present invention holds significant improvements and serves as Am Improved Pet Birthing Box for Animals. For purposes of summarizing the invention, certain aspects, advantages, and novel features of the invention have been described herein. It is to be understood that not necessarily all such advantages may be achieved in accordance with any one particular embodiment of the invention. Thus, the invention may be embodied or carried out in a manner that achieves or optimizes one advantage or group of advantages as taught herein without necessarily achieving other advantages as may be taught or suggested herein. The features of the invention which are believed to be novel are particularly pointed out and distinctly claimed in the concluding portion of the specification. These and other features, aspects, and advantages of the present invention will become better understood with reference to the following drawings and detailed description.

BRIEF DESCRIPTION OF THE DRAWINGS

The figures which accompany the written portion of this specification illustrate embodiments and method(s) of use for the present invention, an Improved Pet Birthing Box for Animals (Entitled the Wiser Whelper), constructed and operative according to the teachings of the present invention.

The various embodiments of the present invention will hereinafter be described in conjunction with the appended drawings, wherein like designations denote like elements.

DETAILED DESCRIPTION

As discussed above, embodiments of the present invention relate to a pet enclosure device and more particularly to an improved pet birthing box for animals (Entitled the Wiser Whelper) having a clear enclosure structured and arranged to prevent accidental smothering of puppies by their mothers suitable for use in early life to keep pets contained and safe due to the sides of the box to be erected quickly to mimic a natural den shape thereby aiding puppies get moving faster while being able to be folded down flat for quick storage.

Generally speaking, the Wiser Whelper includes clear walls allow for easier supervision of the dam (mother) and the litter of puppies. The floor pad is designed to have a circular depression in the middle which reduces the risk of smothering by the dam. Currently, this risk is reduced by using pig rails along the perimeter of the box, but this floor pad design eliminates the need for the pig rails.

The foam floor pad is perhaps the most important feature of the invention that we need protected. It will be either constructed using a mold and pouring liquid foam in until it cures, or by gluing 2 or more sheets of foam on top of each other. The product will be sold with an upholstered, waterproof, and machine-washable liner for comfort. The main feature of the pad is that it has about a 3 ft diameter by 2.5 in deep depression in the center of it. The type of foam isn't important, although it will likely be a Urethane or Polyurethane foam.

The walls will be constructed out of clear acrylic, or possibly clear polycarbonate plastic. They will be supported on each side near the hinge point by either strips of plastic or metal for reinforcement and to reduce the risk of cracking.

The base of the design will be constructed out of sheet metal and welded together to create a strong picture-frame shape that will support the structure of the box.

On each side of the base, in the front and the rear, will be a pair of fabric handles for easy lifting/transport. constructed out of wood or plastic in the future. The foam pad just rests inside this structure.

Also, on the bottom of all four walls will be 2-3 hinges. These hinges will either be riveted or welded into place. Each of the four walls hinges like this from the bottom, and will fold inward toward the center flat for storage.

One of the walls will have a door on it for easy entry/exit. The frame of the door will be supported by plastic or metal strips as well for reinforcement. There will be a latch on the door to lock it closed.

At each of the four corners where the walls meet there will be 1-2 sets of brackets. A set includes 3 pcs. When the walls are upright the brackets are concentric with each other and a pin can be installed. This pin creates a rigid joint at each of the four corners and keeps the walls upright and sturdy. The pins will likely be on a lanyard so they cannot completely come out of the upper bracket effectively trapping the pin so it can't get lost. These brackets are riveted onto the walls. We currently have it designed with 2 sets of brackets at each corner, though testing may show that one will be enough. When the pins are pulled out, all four walls can hinge towards the center and fold flat for storage/transport.

The box will also come with accessories like a food and water bowl which mount to one of the walls as well as a heat lamp to keep the litter warm. The heat lamp will mount to one of the upper corners of the box.

Referring to the drawings by numerals of reference there is shown in FIGS. perspective views illustrating improved pet birthing box 100 for animals according to an embodiment of the present invention.

Figure 1:
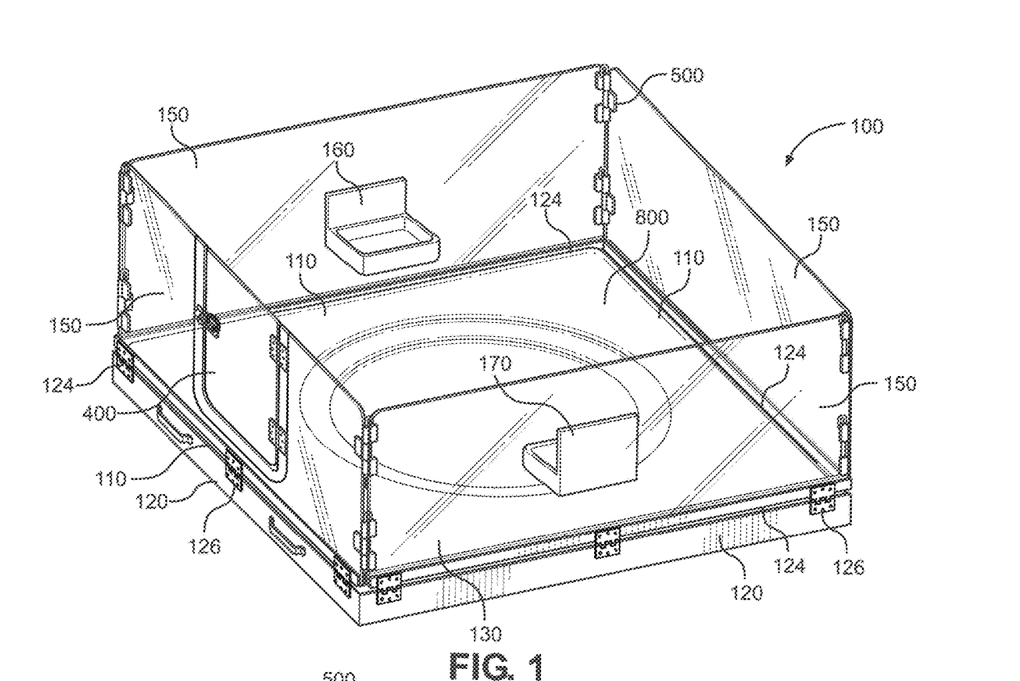
FIG. 1 shows a perspective view illustrating an Improved Pet Birthing Box for Animals according to an embodiment of the present invention.
Figure 2:
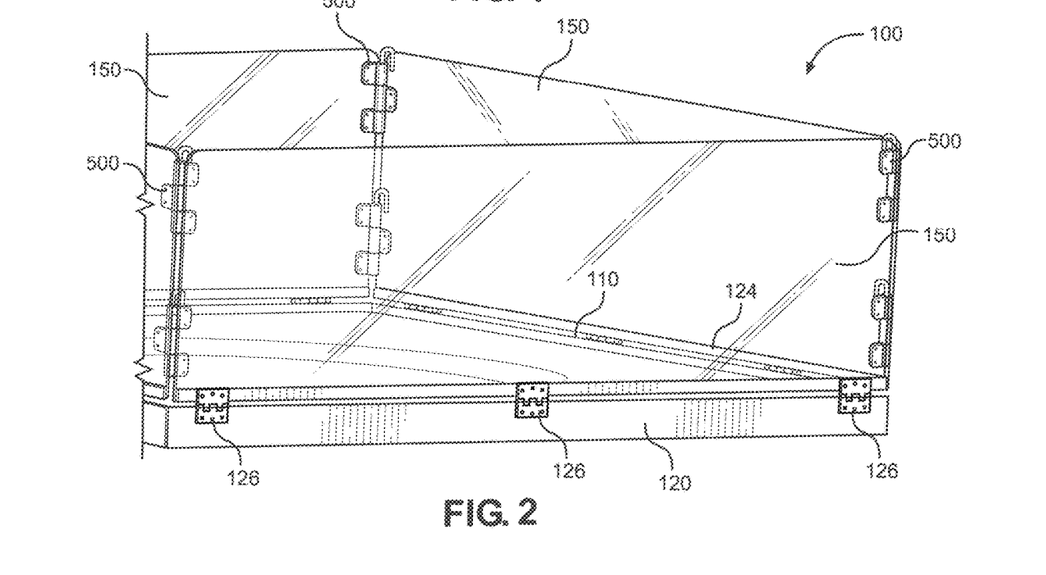
FIG. 2 is a perspective view illustrating a frame including a plurality of side members having frame outer edges and a frame panel holding portion of the Improved Pet Birthing Box for Animals according to an embodiment of the present invention of FIG. 1.
Figure 3:
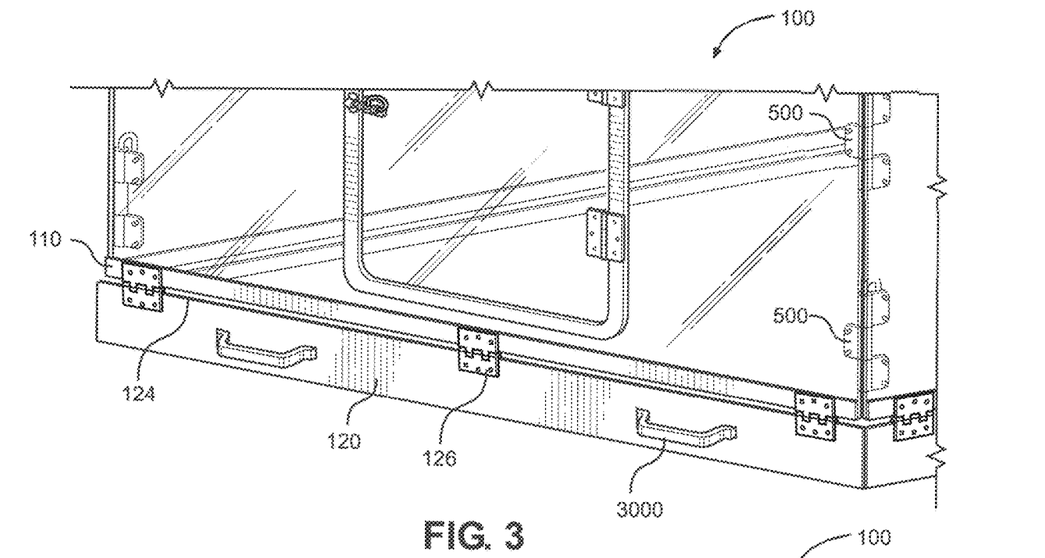
FIG. 3 is a perspective view illustrating a plurality of side members including at least one handle of the Improved Pet Birthing Box for Animals according to an embodiment of the present invention of FIG. 1.
Figure 4:
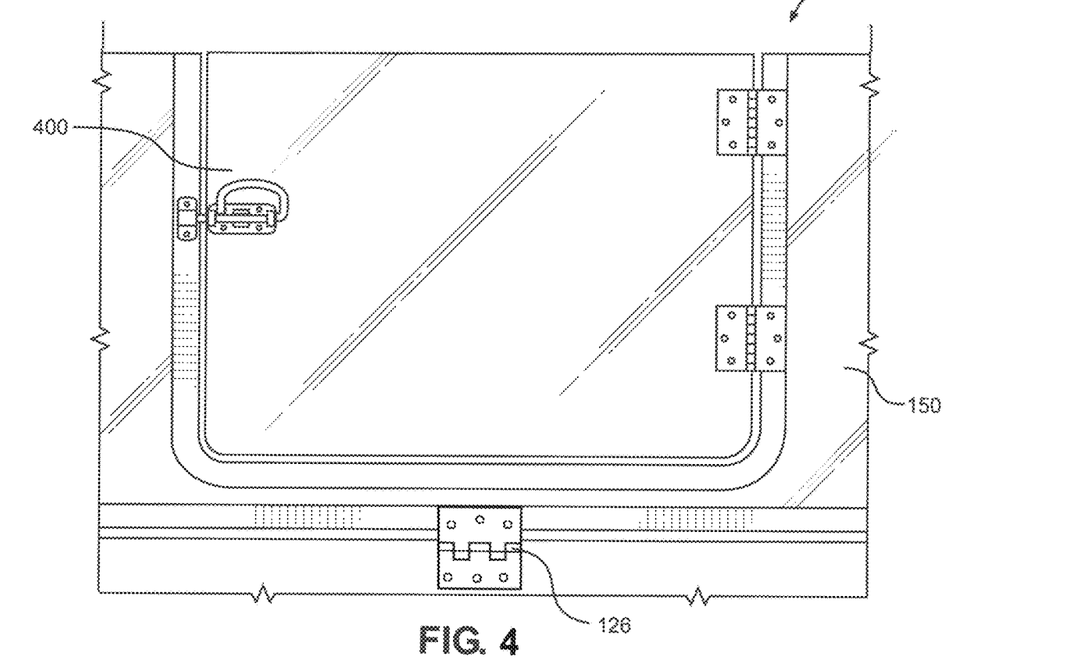
FIG. 4 is a perspective view illustrating a door located on one of the plurality of side panels of the Improved Pet Birthing Box for Animals according to an embodiment of the present invention of FIG. 1.
Figure 5:
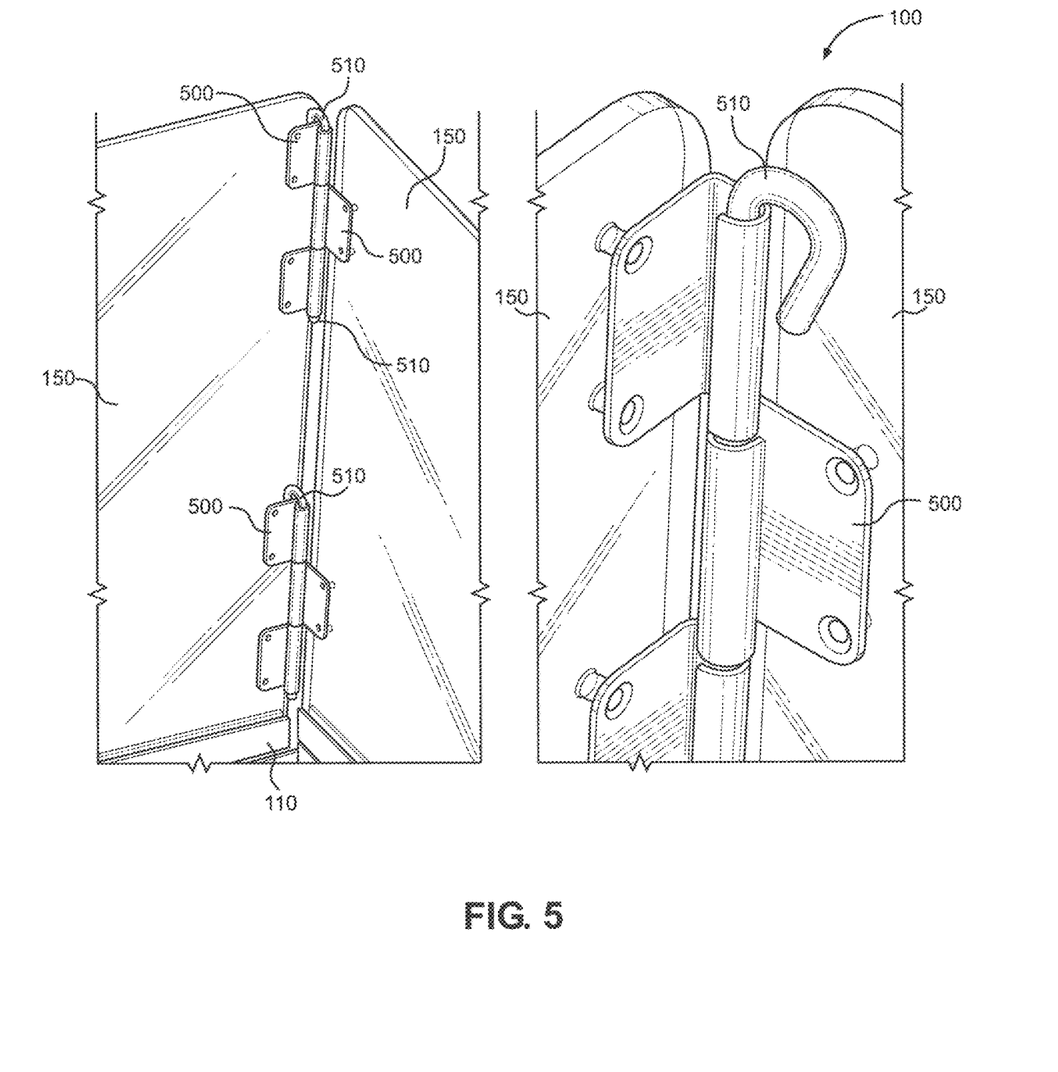
FIG. 5 is a perspective view illustrating the plurality of side panels releasably attach to one another along respective adjacent side portions thereof via brackets and pin members of the Improved Pet Birthing Box for Animals according to an embodiment of the present invention of FIG. 1.
Figure 6:
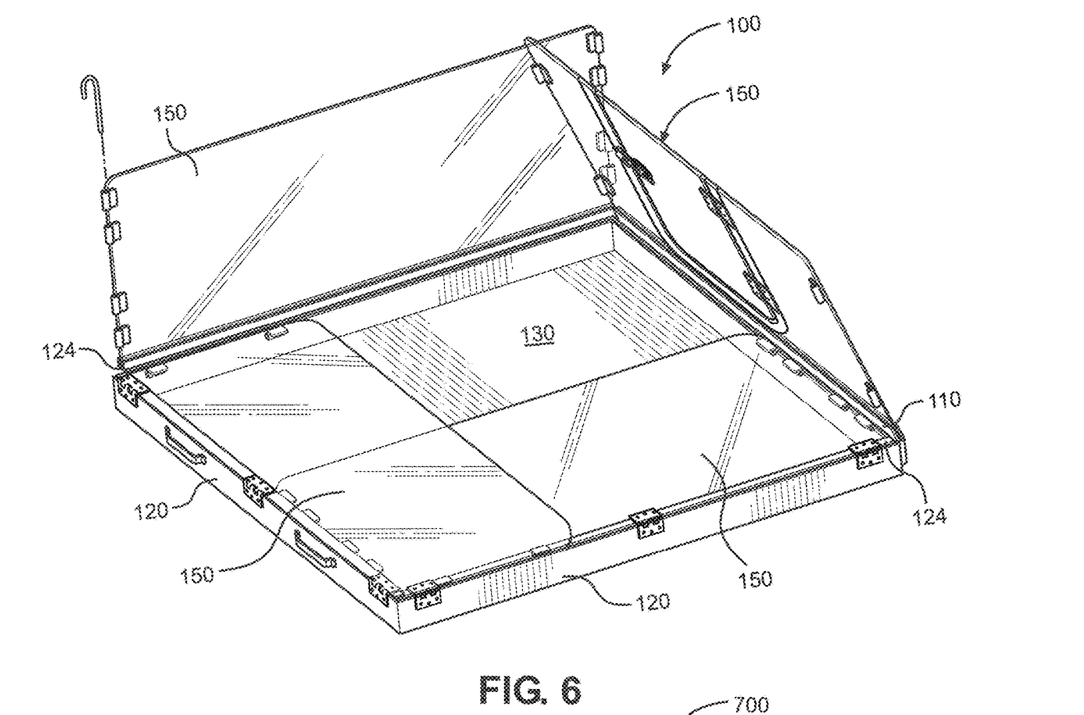
FIG. 6 is a perspective view illustrating the plurality of side panels pivotally connected to said frame outer edges via hinge members of the Improved Pet Birthing Box for Animals according to an embodiment of the present invention of FIG. 1.
Figure 7:
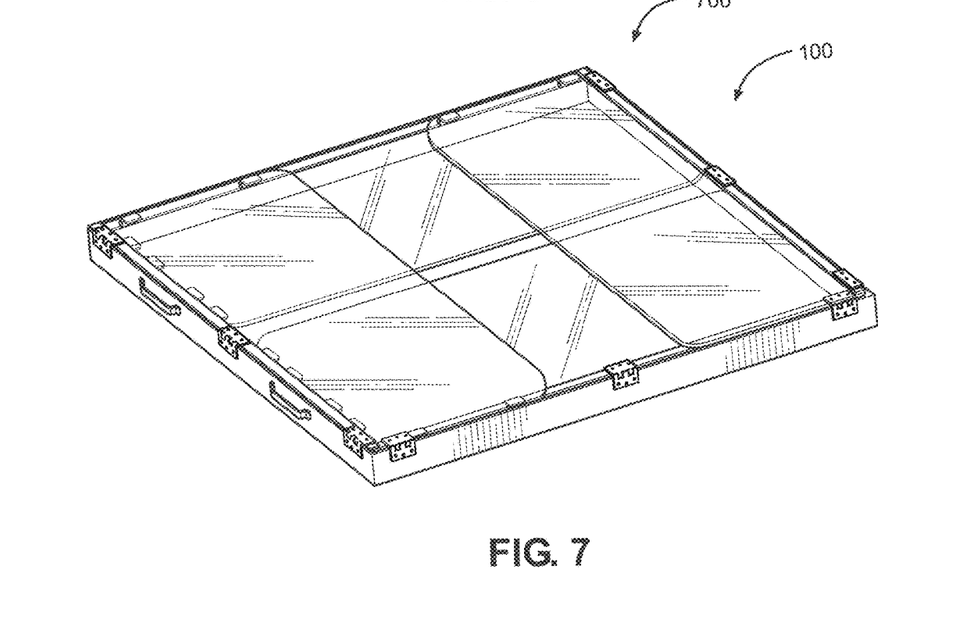
FIG. 7 is a perspective view illustrating the Improved Pet Birthing Box for Animals in a fully collapsed configuration according to an embodiment of the present invention of FIG. 1.

Improved pet birthing box 100 for animals, comprising: frame 110; pad 800; and plurality of side panels 150. Frame 110 includes plurality of side members 120. Wherein plurality of side members 120 are connected together at respective ends thereof forming frame outer edges 124 and frame panel holding portion 130. Wherein plurality of side members 120 are formed having an L-shaped cross-section. Wherein one of plurality of side members 120 includes at least one handle 300 attached thereto as shown in FIG. 3.

Wherein plurality of side members 120 of frame 110 may be formed from sheet metal. Wherein plurality of side members 120 of frame 110 may be is formed from wood. Wherein plurality of side members 120 of frame 110 may be is formed from plastic.

Wherein the plurality of side panels 150 are each adapted to be pivotally connected to frame outer edges 124 and extend upwardly therefrom. Wherein plurality of side panels 150 are adapted to be releasably attach to one another along respective adjacent side portions thereof to form an enclosure around frame 110 as shown in FIG. 1. Wherein when the plurality of side panels 150 are releasably attached to one another along the respective adjacent side portions thereof they form an enclosure around frame 110, and when the plurality of side panels 150 are detached from one another along the respective adjacent side portions thereof panels 150 can be pivoted inwardly toward pad 800 into collapsed configuration 700 for storage or transportation.

Wherein one of plurality of side panels 150 is pivotally connected to an adjacent side panel to thereby form door 400 for a pet to be placed into or to be taken out of improved pet birthing box 100 as shown in FIG. 4. Wherein plurality of side panels 150 are each adapted to be pivotally connected to frame outer edges 124 via hinge members 126. Wherein plurality of side panels 150 are releasably attach to one another along respective adjacent side portions thereof via brackets 500 and pin members 510 as shown in FIG. 5. Wherein plurality of side panels 150 may be formed from acrylic material. Wherein plurality of side panels 150 may be formed from polycarbonate material.

Figure 8:
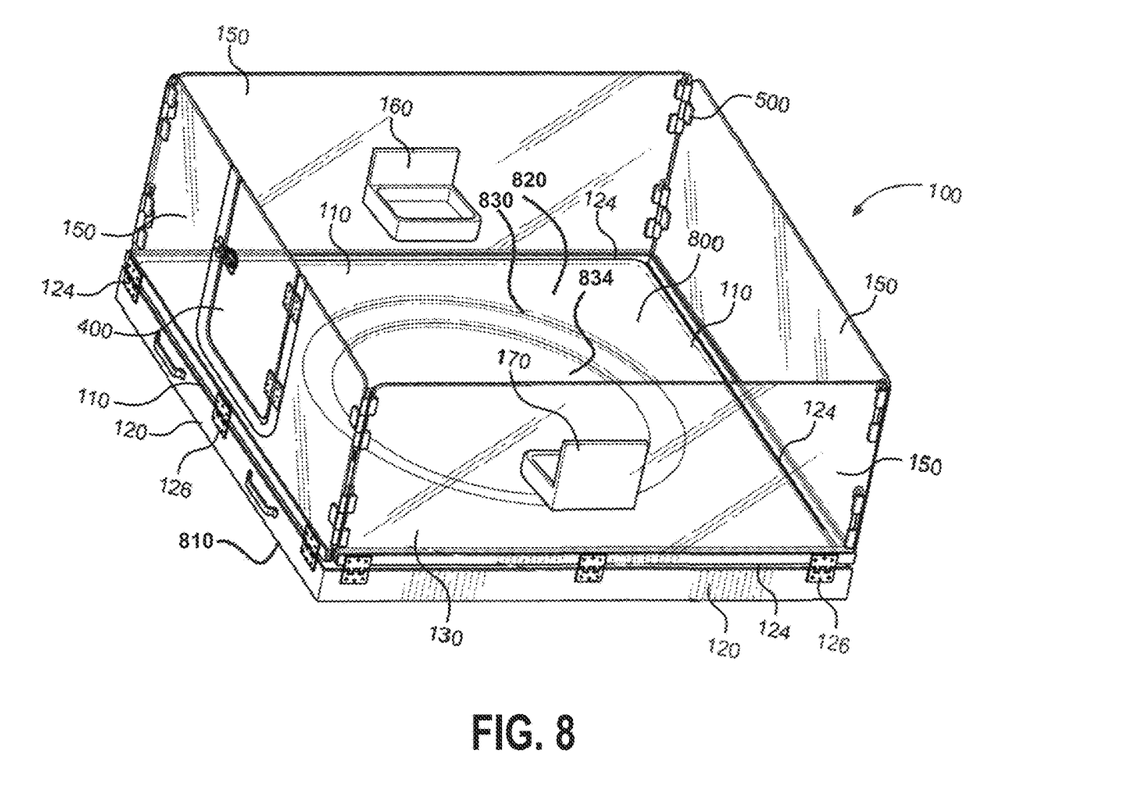
FIG. 8 is a perspective view illustrating a pad of the Improved Pet Birthing Box for Animals according to an embodiment of the present invention of FIG. 1.

Pad 800 includes flat bottom 810 portion and top portion 820 as shown in FIG. 8. Wherein top portion 820 is formed having depression 830 therein adapted to prevent a puppy from being smothered by its mother while birthing, nursing, or sleeping. Wherein depression 830 is formed having circular cross-section. Wherein depression 830 is formed having flat circular bottom surface 834. Wherein depression 830 is formed having a bowl-shape. Wherein depression 830 is formed having dimensions including 3 feet in diameter and 2½ inches in depth. Wherein pad 800 is adapted to be releasably placed upon holding portion 130 of frame 110 and between frame outer edges 124. Wherein pad 800 is formed from a foamed material. Wherein the foamed material is urethane. Wherein the foamed material is polyurethane.

Improved pet birthing box 100 further comprising food dish 160 releasably attached to an inner surface of one of plurality of side panels 150 as shown in FIG. 1. Improved pet birthing box 100 further comprising water dish 170 releasably attached to an inner surface of one of plurality of side panels 150 also shown in FIG. 1.

The embodiments of the invention described herein are exemplary and numerous modifications, variations and rearrangements can be readily envisioned to achieve substantially equivalent results, all of which are intended to be embraced within the spirit and scope of the invention. Further, the purpose of the foregoing abstract is to enable the U.S. Patent and Trademark Office and the public generally, and especially the scientist, engineers and practitioners in the art who are not familiar with patent or legal terms or phraseology, to determine quickly from a cursory inspection the nature and essence of the technical disclosure of the application.

What is claimed is:

1. An improved pet birthing box for animals, comprising:
   a frame including:
      a plurality of side members;
      wherein said plurality of side members are connected together at respective ends thereof forming frame outer edges and a frame panel holding portion;
   a pad including:
      a flat bottom portion; and
      a top portion;
         wherein said top portion is formed having a depression therein adapted to prevent a puppy from being smothered by its mother while birthing, nursing, or sleeping;
      wherein said pad is adapted to be releasably placed upon said holding portion of said frame and between said frame outer edges;
   a plurality of side panels:
      wherein said plurality of side panels are each adapted to be pivotally connected to said frame outer edges and extend upwardly therefrom; and
      wherein said plurality of side panels are adapted to be releasably attach to one another along respective adjacent side portions thereof to form an enclosure around said frame;
   wherein when said plurality of side panels are releasably attached to one another along said respective adjacent side portions thereof they form an enclosure around said frame, and when said plurality of side panels are detached from one another along said respective adjacent side portions thereof the panels can be pivoted inwardly toward said pad into a collapsed configuration for storage or transportation.

2. The improved pet birthing box of claim 1, wherein said depression is formed having a circular cross-section.

3. The improved pet birthing box of claim 2, wherein said depression is formed having a flat circular bottom surface.

4. The improved pet birthing box of claim 3, wherein said depression is formed having dimensions including 3 feet in diameter and 2½ inches in depth.

5. The improved pet birthing box of claim 2, wherein said depression is formed having a bowl-shape.

6. The improved pet birthing box of claim 1, wherein said plurality of side members are formed having an L-shaped cross-section.

7. The improved pet birthing box of claim 1, wherein one of said plurality of side panels is pivotally connected to an adjacent side panel to thereby form a door for a pet to be placed into or to be taken out of said improved pet birthing box.

8. The improved pet birthing box of claim 1, wherein said plurality of side panels are each adapted to be pivotally connected to said frame outer edges via hinge members.

9. The improved pet birthing box of claim 1, wherein said plurality of side panels are releasably attach to one another along respective adjacent side portions thereof via brackets and pin members.

10. The improved pet birthing box of claim 1, wherein one of said plurality of side members includes at least one handle attached thereto.

11. The improved pet birthing box of claim 1, wherein said plurality of side members of said frame is formed from sheet metal.

12. The improved pet birthing box of claim 1, wherein said pad is formed from a foamed material.

13. The improved pet birthing box of claim 12, wherein said foamed material is urethane.

14. The improved pet birthing box of claim 12, wherein said foamed material is polyurethane.

15. The improved pet birthing box of claim 1, wherein said plurality of side panels are formed from acrylic material.

16. The improved pet birthing box of claim 1, wherein said plurality of side panels are formed from polycarbonate material.

17. The improved pet birthing box of claim 1, wherein said plurality of side members of said frame is formed from wood.

18. The improved pet birthing box of claim 1, wherein said plurality of side members of said frame is formed from plastic.

19. The improved pet birthing box of claim 1, further comprising a food dish releasably attached to an inner surface of one of said plurality of side panels.

20. The improved pet birthing box of claim 1, further comprising a water dish releasably attached to an inner surface of one of said plurality of side panels.

\* \* \* \* \*